No. 750,677. PATENTED JAN. 26, 1904.
J. MORAWETZ.
GOPHER TRAP.
APPLICATION FILED JULY 2, 1903.
NO MODEL.
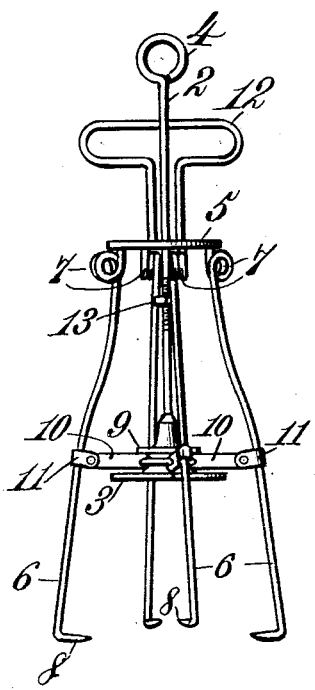
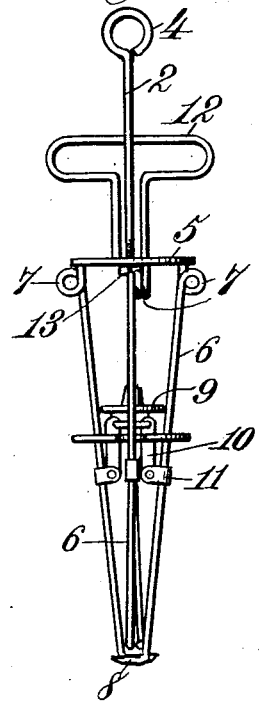
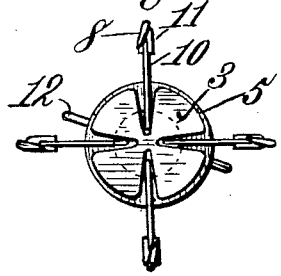
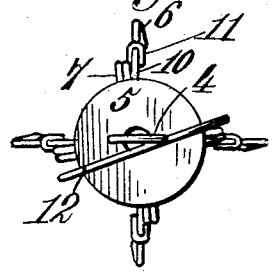
Witnesses
Robert Everett
James L. Norris Jr.
Inventor
John Morawetz
By James L. Norris
Atty.

No. 750,677. Patented January 26, 1904.

UNITED STATES PATENT OFFICE.

JOHN MORAWETZ, OF CASTELLA, CALIFORNIA.

GOPHER-TRAP.

SPECIFICATION forming part of Letters Patent No. 750,677, dated January 26, 1904.

Application filed July 2, 1903. Serial No. 164,095. (No model.)

*To all whom it may concern:*

Be it known that I, JOHN MORAWETZ, a citizen of the United States, residing at Castella, in the county of Shasta and State of California, have invented new and useful Improvements in Gopher-Traps, of which the following is a specification.

This invention relates to gopher-traps. This title is selected merely as a convenient one, as the improved article has been found particularly advantageous for trapping gophers, in which use it will be hereinafter described. It, however, may be employed with equal facility for catching other animals.

The device is simple, light, yet thoroughly strong, can be easily and quickly set and as readily operated by an animal without the necessity of bait in such a manner as to securely imprison him.

In the following description I will set forth in detail one adaptation of the trap, which is clearly illustrated in the accompanying drawings, forming a part of this specification, the novelty of my invention being embraced by the claims succeeding such description. I do not of course limit myself to the exact disclosures thus made, for certain changes may be adopted within the scope of said claims.

Referring to said drawings, Figure 1 is a side elevation of a trap including the invention and illustrating the arms thereof as open and set. Fig. 2 is a similar view of the trap, but showing the arms closed or in position to trap an animal. Fig. 3 is a bottom plan view of the same with said arms open. Fig. 4 is a top plan view of said trap.

Like characters refer to like parts throughout the several figures.

The improved trap involves in its organization an elongated stem 2, which may be inexpensively made from wire. To the lower end of this stem is suitably fastened a head or plate 3, consisting of a disk having a plurality of radial slots extending outwardly from near its center and opening into its periphery. The walls of these slots (shown as four in number) diverge outward, so as to insure the entrance thereinto of certain links, hereinafter more fully described. The upper end of the stem 2 is provided with an eye 4, the function of which will be hereinafter set forth. The body or collar 5 (represented as a disk) surrounds the stems 2 between the slotted head and eye, it being in the present case centrally perforated to receive freely said stem, whereby said body 5 can have a movement relatively to the head 3 longitudinally of the stem. The perforation in the body 5 is larger in diameter than the external diameter of the stem, so that there will be no friction between these two parts as the body is moved back and forth.

The animal is caught or trapped by jaws, as 6, as will hereinafter appear. These jaws 6 consist of elongated arms, also represented as made from wire, and the upper ends of which are provided with coiled springs 7, the terminal helices of which are suitably united to the body 5 in order to automatically close or swing the jaws or arms 6 inward. The free ends of the jaws are provided with inwardly-disposed prongs or barbs 8, adapted to slightly penetrate the flesh of an animal, such as a gopher, when he releases the set jaws.

Back of the head 3 is an annular shoulder 9, acting as a stop, as will hereinafter appear, and to the stem 2, between this shoulder and head, the inner ends of the jaw-spreading links 10 are illustrated as pivoted, the opposite ends of said links being likewise jointed to the inwardly-disposed lugs or projections 11, arranged substantially centrally of the lengths of the jaws or arms 6.

A setting-handle, as 12, is represented as fastened to the upper or outer side of the body 5. This handle is shown as being of open or skeleton form and approximately of T shape, its shank being suitably united to the head. It, like the stem 2 and jaws 6, is preferably made from wire, the stem having a movement in a plane between the sides of said shank.

The following is the operation that takes place in setting the trap. Initially a thumb is placed in the eye 4, and the first and second fingers of the same hand are introduced into the open cross portion of the handle 12. Said handle is then drawn toward the eye, the body 5, and hence the jaws 6, being moved thereby in a corresponding direction. The links 10 by reason of their connection with said jaws are swung outward angularly to the stem, and as the motion in question continues the outer pivotal points of said links are caused to cross a center line, which line is perpendicular to the longitudinal axis of the stem. When this ensues, the jaws are locked open, it being understood that during the outward swinging motion of said links they serve to spread the jaws open. As said jaws are opened the springs 7 are placed under tension, so that when the jaws are released by an animal said jaws can be quickly and automatically closed by the springs. A slight thrust or pressure upward against the head 3 will cause said head to move upward and the outer pivotal points of the links 10 to move below the center line mentioned, and the instant this occurs the jaws 6 will be released, so that their springs 10 can move them inward at an accelerated speed to cause the barbs or prongs 8 at the free ends of said jaws to impale an animal sufficiently to imprison him. As the jaws close the links are caused to enter the mouths or open ends of the guide-slots in the head 3, the walls of which positively prevent lateral motion of said jaws as they close. As the said walls diverge outwardly from the center of said head the jaws are accurately directed into said slots. The shoulder 9, as previously indicated, serves as a stop. The links 10 strike against said shoulder or stop in order to limit the opening movement of the jaws 6.

The stem 2 above the body 5 is exteriorly threaded to receive the nut 13, constituting an adjustable stop, and which may be run up or down along the stem 2 to adjust the movement of the body 5—that is, said nut may be manipulated so that the head on its ascending movement will engage the same just after the outer pivots of the links have crossed the center line hereinbefore mentioned, or the nut can be set to be engaged by the head to permit a greater upward movement of said outer pivotal points. In the former case a much lighter pressure will be required to effect the release of the jaws than in the latter.

When the trap is set, it is inserted into a gopher-hole with the slotted head or plate 3 approximately at the entrance of the hole and with the pronged ends of the jaws 6 down. As the gopher commences to fill up the hole, against the walls of which the opened jaws are resting, the dirt thrown up by him as he works in the space between said jaws strikes the plate 3 and thrusts the same upward, and thereby releases said jaws, which are instantly closed by the springs 7 around the animal to securely hold him in the manner hereinbefore indicated.

Having thus described my invention, what I claim as new, and desire to secure by Letters Patent, is—

1. In a trap, a stem provided with a head having a plurality of slots open at their outer ends, a body surrounding the stem and movable relatively thereto, jaws, the upper ends of which are provided with springs, connected with said body, and links pivotally connected with the stem and jaws respectively, said springs serving to close the jaws, and the links being adapted to enter the slots upon the closing of the jaws.

2. In a trap, a stem having a slotted head at its lower end and an eye at its upper end, a body surrounding the stem and movable relatively thereto between said head and eye, a handle connected with the upper side of the body, jaws, provided at their upper ends with closing-springs, connected with said body, and links pivotally connected with the stem and jaws respectively, said links being adapted to enter the slots in the head upon the closing of the jaws.

3. In a trap, a stem having a slotted head at its lower end, a body surrounding the stem and movable relatively thereto, jaws, provided with springs at their upper ends, connected with said body, links pivotally connected with the stem and jaws respectively and adapted to enter said slots upon the closing of the jaws, and an adjustable stop upon the stem for limiting the upward movement of said body.

4. In a trap, a stem having a slotted head at its forward end, a body surrounding the stem and movable relatively thereto, jaws, provided with springs at their upper ends, connected with said body, links pivotally connected with the stem and jaws respectively and adapted to enter said slots upon the closing of the jaws, and a nut threaded onto the stem for limiting the upward movement of the body.

5. In a trap, a stem provided with a slotted head at one end and a shoulder arranged above the head, a body surrounding the stem and movable relatively thereto, jaws provided with closing-springs connected with said body, links pivoted to the stem between said head and shoulder and also pivotally connected with said jaws, the links, upon the closing of the jaws, being adapted to enter said slots, and a setting-handle connected to said body.

6. In a trap, a stem provided with a slotted head at one end and an eye at the other, a body surrounding the stem and movable relatively thereto, jaws, provided with closing-springs, connected with said body and having inwardly-disposed prongs at their free ends, links pivotally connected with the stem and jaws respectively and adapted to enter the slots in the head upon the closing of the jaws, and a setting-handle of substantially T shape fastened to the upper side of said body.

In testimony whereof I have hereunto set my hand in presence of two subscribing witnesses.

JOHN MORAWETZ.

Witnesses:
S. R. GONGWER,
G. E. WRIGHT.